US011900096B2

(12) United States Patent
Mahishi et al.

(10) Patent No.: US 11,900,096 B2
(45) Date of Patent: Feb. 13, 2024

(54) HITLESS UPGRADE OF A NETWORK DEVICE

(71) Applicant: Juniper Networks, Inc., Sunnyvale, CA (US)

(72) Inventors: Shrish Mahishi, Bangalore (IN); Ramesh Rajan, San Jose, CA (US); Vijay Paul, San Jose, CA (US); Sanjeev Anandrao Mahajan, Bangalore (IN); Atit Jain, Bangalore (IN); Pramod Srinivasan, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 81 days.

(21) Appl. No.: 17/655,686

(22) Filed: Mar. 21, 2022

(65) Prior Publication Data
US 2023/0297358 A1 Sep. 21, 2023

(51) Int. Cl.
*G06F 8/656* (2018.01)
*G06F 9/445* (2018.01)
(Continued)

(52) U.S. Cl.
CPC ............ *G06F 8/65* (2013.01); *G06F 8/61* (2013.01); *G06F 8/656* (2018.02); *H04L 41/082* (2013.01); *H04L 41/12* (2013.01); *H04L 45/48* (2013.01); *H04L 45/586* (2013.01); *H04L 67/1097* (2013.01); *H04L 67/148* (2013.01)

(58) Field of Classification Search
CPC ... G06F 8/65; G06F 8/656; G06F 8/61; G06F 8/4416; H04L 41/082; H04L 41/12; H04L 45/586; H04L 45/48; H04L 67/1097; H04L 67/148
See application file for complete search history.

(56) References Cited

U.S. PATENT DOCUMENTS 10,083,026 B1 * 9/2018 Venkata ................ H04L 41/082
10,732,961 B1 * 8/2020 Madasamy ............ G06F 8/656
(Continued)

OTHER PUBLICATIONS

Yuanjie Li et al., A Control-Plane Perspective on Reducing Data Access Latency in LTE Networks, Oct. 16-20, 2017, [Retrieved on Sep. 14, 2023]. Retrieved from the internet: <URL: https://dl.acm.org/doi/pdf/10.1145/3117811.3117838> 14 Pages (56-69) (Year: 2017).*

(Continued)

*Primary Examiner* — Anibal Rivera
(74) *Attorney, Agent, or Firm* — Harrity & Harrity, LLP

(57) ABSTRACT

A network device obtains a data package associated with an ISSU procedure and determines, based on the data package, that a control plane of the network device is to be rebooted to facilitate performance of the ISSU procedure. The network device causes, based on determining that the control plane is to be rebooted, a plurality of applications of the network device to stop executing on the network device and a control plane state of the network device to be frozen. The network device then causes the ISSU procedure to be performed. The network causes, based on causing the ISSU procedure to be performed, the control plane state of the network device to be restored and the plurality of applications to resume executing on the network device.

20 Claims, 11 Drawing Sheets

(51) Int. Cl.
*G06F 8/65* (2018.01)
*H04L 41/12* (2022.01)
*H04L 67/148* (2022.01)
*H04L 45/586* (2022.01)
*H04L 45/48* (2022.01)
*G06F 8/61* (2018.01)
*H04L 41/082* (2022.01)
*H04L 67/1097* (2022.01)

(56) References Cited

U.S. PATENT DOCUMENTS

| | | | |
|---|---|---|---|
| 11,405,272 B1* | 8/2022 | Khan | H04L 41/0895 |
| 2006/0233182 A1* | 10/2006 | Appanna | H04L 45/563 |
| | | | 370/401 |
| 2009/0279549 A1* | 11/2009 | Ramanathan | G06F 8/65 |
| | | | 709/250 |
| 2014/0050077 A1* | 2/2014 | Kasat | H04L 12/4641 |
| | | | 370/216 |
| 2016/0313986 A1 | 10/2016 | Liguori et al. | |
| 2020/0310784 A1* | 10/2020 | Krishnan | H04L 69/164 |
| 2021/0227054 A1 | 7/2021 | Khan et al. | |
| 2022/0094645 A1* | 3/2022 | Khan | H04L 69/08 |

OTHER PUBLICATIONS

Petra Vizarreta et al., Dason: Dependability Assessment Framework for Imperfect Distributed SDN Implementations, Jun. 2020, [Retrieved on Sep. 14, 2023]. Retrieved from the internet: <URL: https://ieeexplore.ieee.org/stamp/stamp.jsp?arnumber=8999561> 16 Pages (652-667) (Year: 2020).*

Extended European Search Report for Application No. EP22171847.1, dated Oct. 24, 2022, 11 pages.

Wand et al., "Virtual Routers on the Move," Sigcomm'08 Proceedings, ACM, Aug. 2008, pp. 231-242, DOI: 10.1145/1402958.1402985.

* cited by examiner

HITLESS UPGRADE OF A NETWORK DEVICE

BACKGROUND

An in-service software upgrade (ISSU) procedure is a technique for updating software on a network device without taking the network device offline. In this way, the network device can be updated while minimizing disruption to traffic and control plane services provided by the network device.

SUMMARY

Some implementations described herein relate to a network device. The network device may include one or more memories and one or more processors. The network device may be configured to obtain a data package associated with an ISSU procedure. The network device may be configured to determine, based on the data package, that a control plane of the network device is to be rebooted to facilitate performance of the ISSU procedure. The network device may be configured to cause, based on determining that the control plane is to be rebooted, a plurality of applications of the network device to stop executing on the network device. The network device may be configured to cause, based on causing the plurality of applications to stop executing, a control plane state of the network device to be frozen. The network device may be configured to cause, based on causing the control plane state of the network device to be frozen, the ISSU procedure to be performed. The network device may be configured to cause, based on causing the ISSU procedure to be performed, the control plane state of the network device to be restored. The network device may be configured to cause, based on causing the control plane state of the network device to be restored, the plurality of applications to resume executing on the network device.

Some implementations described herein relate to a non-transitory computer-readable medium that stores a set of instructions for a network device. The set of instructions, when executed by one or more processors of the network device, may cause the network device to determine that a control plane of the network device is to be rebooted as part of performance of an ISSU procedure. The set of instructions, when executed by one or more processors of the network device, may cause the network device to cause, based on determining that the network device is to be rebooted, a plurality of applications of the network device to stop executing on the network device. The set of instructions, when executed by one or more processors of the network device, may cause the network device to cause, based on causing the plurality of applications to stop executing, a control plane state of the of the network device to be frozen. The set of instructions, when executed by one or more processors of the network device, may cause the network device to cause, after causing the control plane state of the network device to be frozen, the ISSU procedure to be performed.

Some implementations described herein relate to a method. The method may include causing, by a network device, a plurality of applications of the network device to stop executing on the network device. The method may include causing, by the network device and based on causing the plurality of applications to stop executing, a control plane state of the network device to be frozen. The method may include causing, by the network device and based on causing the control plane state of the network device to be frozen, an ISSU procedure to be performed.

DETAILED DESCRIPTION

Figure 1A:
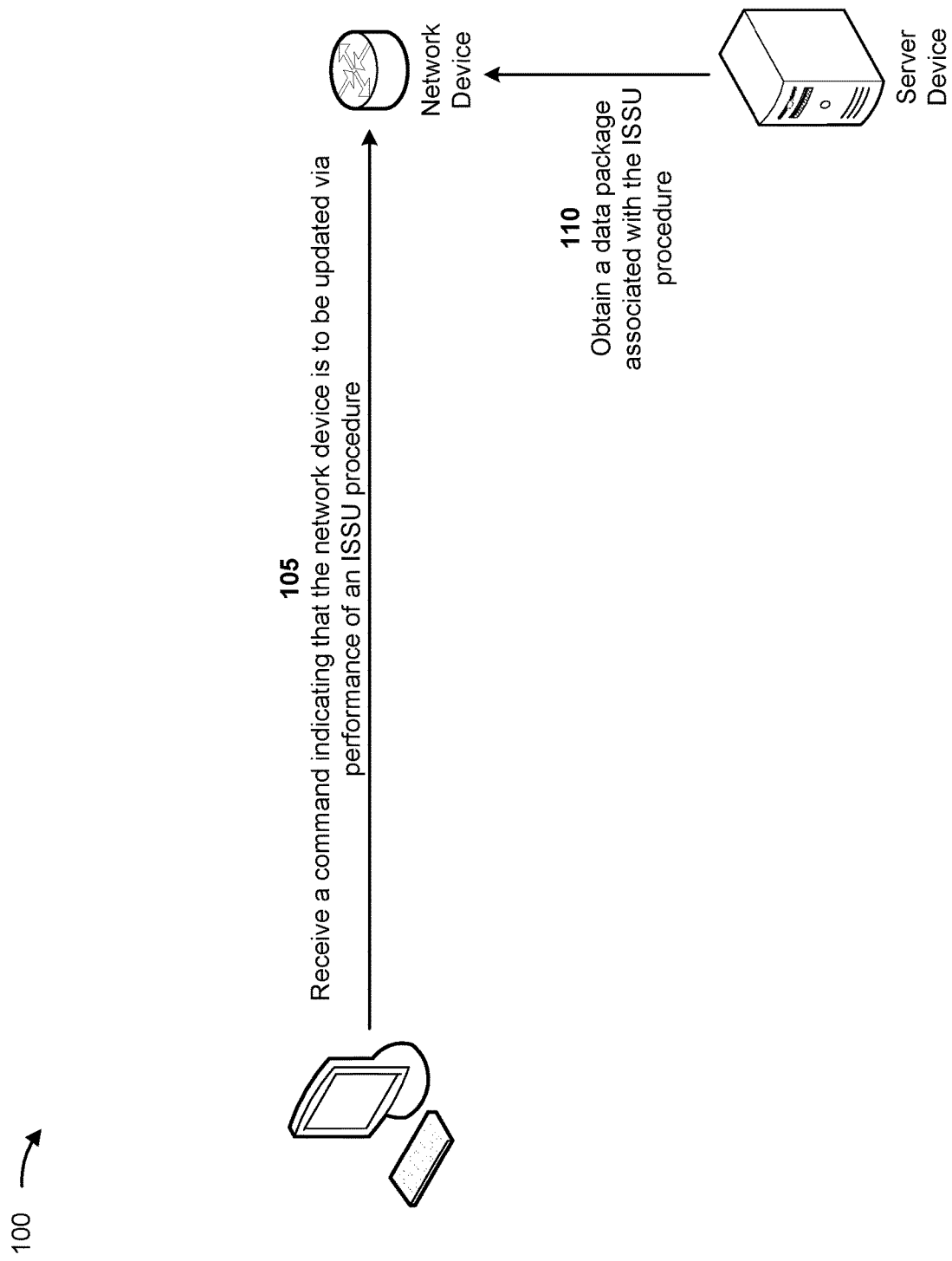
FIGS. 1A-1G are diagrams of an example implementation described herein.

The following detailed description of example implementations refers to the accompanying drawings. The same reference numbers in different drawings may identify the same or similar elements.

A network device includes a control plane (e.g., to manage operation of the network device) and a data plane (e.g., to route packets, or other data, to and from the network device). The network device may execute a plurality of applications to enable one or more functionalities of the control plane, such as one or more applications to generate and maintain routes (e.g., to and from other network devices), one or more applications to manage the network device (e.g., related to power management, thermal management, hardware management, and/or other management of the network device), and/or one or more applications to manage packet forwarding by the network device, among other examples.

Typically, a network device includes multiple routing engine modules, such as a primary routing engine module and a backup routing engine module. When the network device is to be upgraded, the network device may perform an in-service software upgrade (ISSU) procedure to update the network device. Accordingly, the routing engine modules are updated one at a time, with one routing engine module in operation while the other routing engine module is updated. In this way, the control plane of the network device can be updated without taking the network device offline. However, in many cases, a network device does not have multiple routing engine modules, so performing an ISSU procedure causes the network device to be taken offline. This impacts an operational performance of the network device and causes networking issues (e.g., misrouting issues, blackholing issues, or other issues) associated with the impacted operational performance of the network device.

Some implementations described herein are directed to providing a "hitless upgrade" of a network device (e.g., the network device is able to continue routing packets via a data plane of the network device while a control plane of the network device undergoes an upgrade). The network device obtains a data package associated with an ISSU procedure (e.g., to update the control plane of the network device) and determines whether the control plane of the network device is to be rebooted to facilitate performance of the ISSU procedure. For example, the network device determines that the control plane is to be rebooted when an application, of a plurality of applications, of the network device (e.g., that is able to modify the control plane state of the network device) is impacted by performance of the ISSU procedure and/or that a control plane operating system and kernel of the network device is to be updated by performance of the ISSU procedure.

Accordingly, the network device causes the plurality of applications to stop executing on the network device and causes the control plane state of the network device to be frozen (e.g., by saving data objects associated with execution of the plurality of applications in a data structure). The network device then causes the ISSU procedure to be performed (e.g., while the plurality of applications are stopped and while the control plane state is frozen). After performance of the ISSU procedure, the network device causes the control plane state to be restored (e.g., by restoring the data objects to distributed data structures of the network device) and cause the plurality of applications to resume executing.

In this way, the network device continues to route traffic (e.g., via the data plane of the network device) while the network device performs processing steps associated with performing the ISSU procedure. Notably, by stopping execution of the plurality of applications and freezing the control plane state, the network device is able to quickly recover a control plane functionality (after performance of the ISSU procedure) that is similar to a control plane functionality of the network device prior to performance of the ISSU procedure. In this way, the control plane state of the network device is also able to be more quickly updated after performance of the ISSU procedure (e.g., because the control plane state does not need to be entirely recreated).

This improves an operational performance of the network device and therefore reduces a likelihood of networking issues (e.g., misrouting issues, blackholing issues, or other issues) resulting from performance of the ISSU procedure (e.g., as compared to a likelihood of networking issues resulting from performance of the ISSU procedure without stopping execution of the plurality of applications and freezing the control plane state). Accordingly, the reduced likelihood of networking issues minimizes use of computing resources (e.g., processing resources, memory resources, communication resources, and/or power resources, among other examples) of the network device and/or one or more other devices that would otherwise be needed to address an increased likelihood of networking issues.

FIGS. 1A-1G are diagrams of one or more example implementations 100 described herein. Example implementation(s) 100 may include a network device, a client device, and/or a server device, which are described in more detail below in connection with FIGS. 2-4. The one or network device, the client device, and/or the server device may be configured to communicate with each other via a network.

The network device may include a control plane and a data plane and may execute a plurality of applications to enable one or more functionalities of the control plane, such as one or more applications to generate and maintain routes (e.g., to and from other network devices), one or more applications to manage the network device (e.g., related to power management, thermal management, hardware management, and/or other management of the network device), and/or one or more applications to manage packet forwarding by the network device, among other examples. At least some of the plurality of applications, when executed by the network device, may update a control plane state of the of the network device. The control plane of the network device may include one or more modules, or other logical elements, to facilitate performance of control plane functions. For example, the control plane of the network device may include a control plane operating system and kernel, an orchestration module (e.g., to manage operations of other modules of the control plane), an image module (e.g., to maintain and update an image of the network device), a system control module (e.g., to control execution of the plurality of applications), a storage control module (e.g., to control storage of data objects associated with execution of the plurality of applications), a routing control module (e.g., to control routing of packets to and from the network device), and/or other modules.

As shown in FIG. 1A, and by reference number 105, the network device may receive a command, such as from the client device. For example, a user of the client device may interact with a user interface provided by the network device (e.g., a command line interface (CLI), a graphical user interface (GUI), or another interface) to enter the command, and the client device may send the command to the network device (e.g., to the orchestration module of the network device). The command may indicate that the network device is to be updated via performance of an ISSU procedure. For example, the command may include an instruction to communicate with the server device to obtain a data package that is associated with the ISSU procedure (e.g., a software installation package that includes an updated network device image and/or other upgrade information associated with the ISSU procedure) and to cause the ISSU procedure to be performed (e.g., based on the data package).

As shown by reference number 110, the network device may obtain the data package from the server device (e.g., based on the command received from the client device). For example, the network device (e.g., using the orchestration module and/or the image module) may send (e.g., based on the command) a request (e.g., for the data package that is associated with the ISSU procedure) to the server device, and the server device may send (e.g., based on the request) the data package to the network device. Accordingly, the network device may receive the data package and may therefore perform one or more additional steps related to performance of the ISSU procedure, as described herein.

Figure 1B:
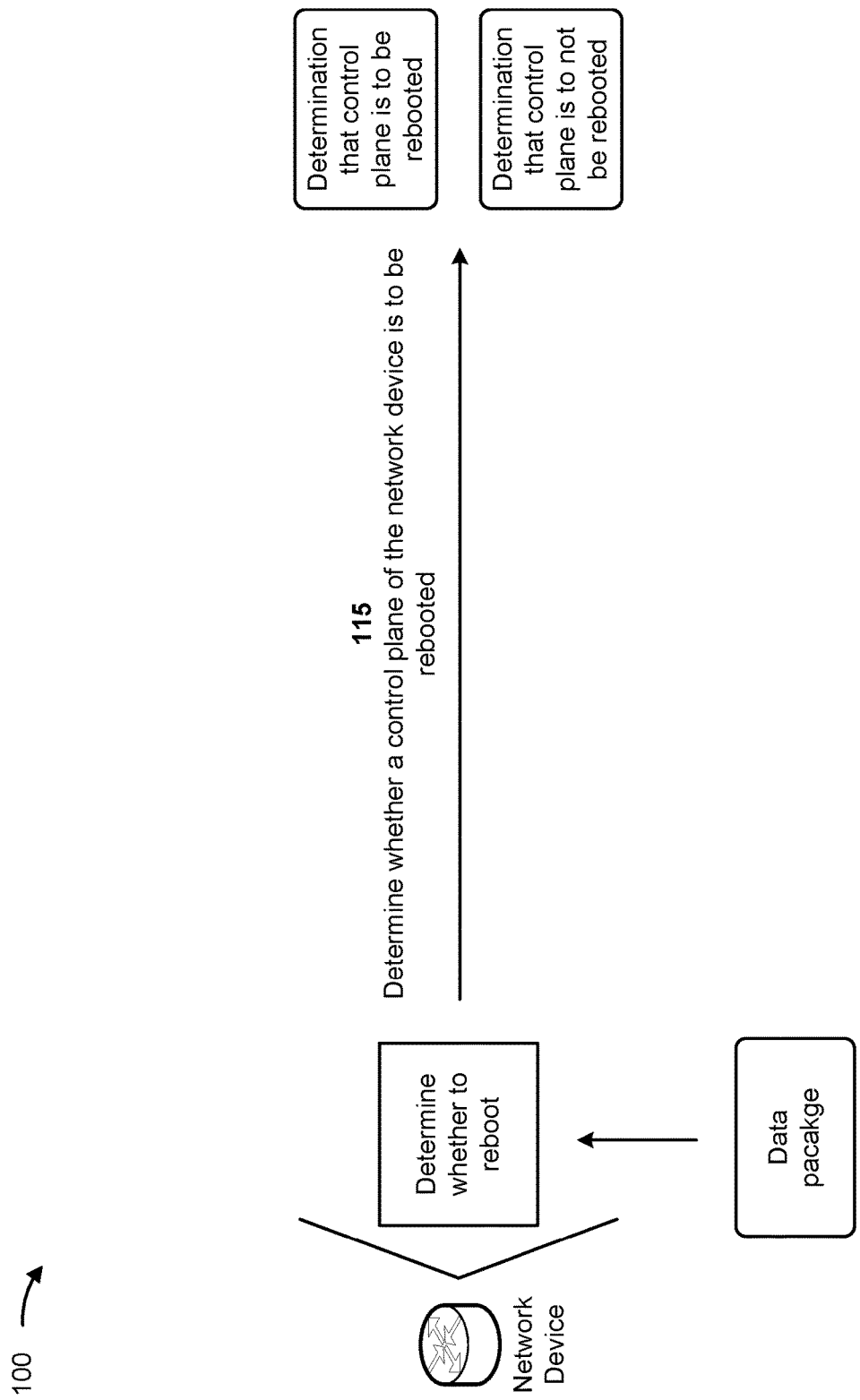

As shown by reference number 115 in FIG. 1B, the network device may determine whether a control plane of the network device is to be rebooted (e.g., as part of and/or to facilitate performance of the ISSU procedure). In some implementations, the network device may determine that the control plane of the network device is to be rebooted. For example, the network device (e.g., using the orchestration module) may process (e.g., parse and/or install) the data package to identify a first set of one or more applications, of a plurality of applications of the network device, that are to be updated as a result of performance of the ISSU procedure (e.g., the data package may list or otherwise indicate the set of one or more applications). The network device then may determine (e.g., based on the first set of one or more applications and/or by searching a table of application dependencies) a second set of one or more applications, of the plurality of applications, that rely on the first set of one or more applications (and therefore are to be affected by an update of the first set of one or more applications). The network device may identify a third set of one or more applications that are to be impacted by performance of the ISSU procedure as including the first set of one or more applications and/or the second set of one or more applications. Accordingly, the network device may determine that the control plane of the network device is to be rebooted (e.g., based on determining that at least one application, of the third set of one or more applications, updates the control plane state of the network device). As another example, the network device may process (e.g., parse and/or install) the data package to determine that a control plane operating system and kernel of the network device is to be updated as a result of performance of the ISSU procedure and may thereby determine that the control plane of the network device is to be rebooted. Accordingly, the network device may perform one or more of the processing steps described herein associated with FIGS. 1D-1F.

Alternatively, the network device may determine that the control plane is to not be rebooted. For example, the network device may determine that no application, of the third set of one or more applications, updates the control plane state of the network device and/or that the control plane operating system and kernel of the network device is to not be updated as a result of performance of the ISSU procedure. Accordingly, the network device network device may determine that the network device is to not be rebooted, and the network device may perform one or more of the processing steps described herein associated with FIG. 1C.

Figure 1C:
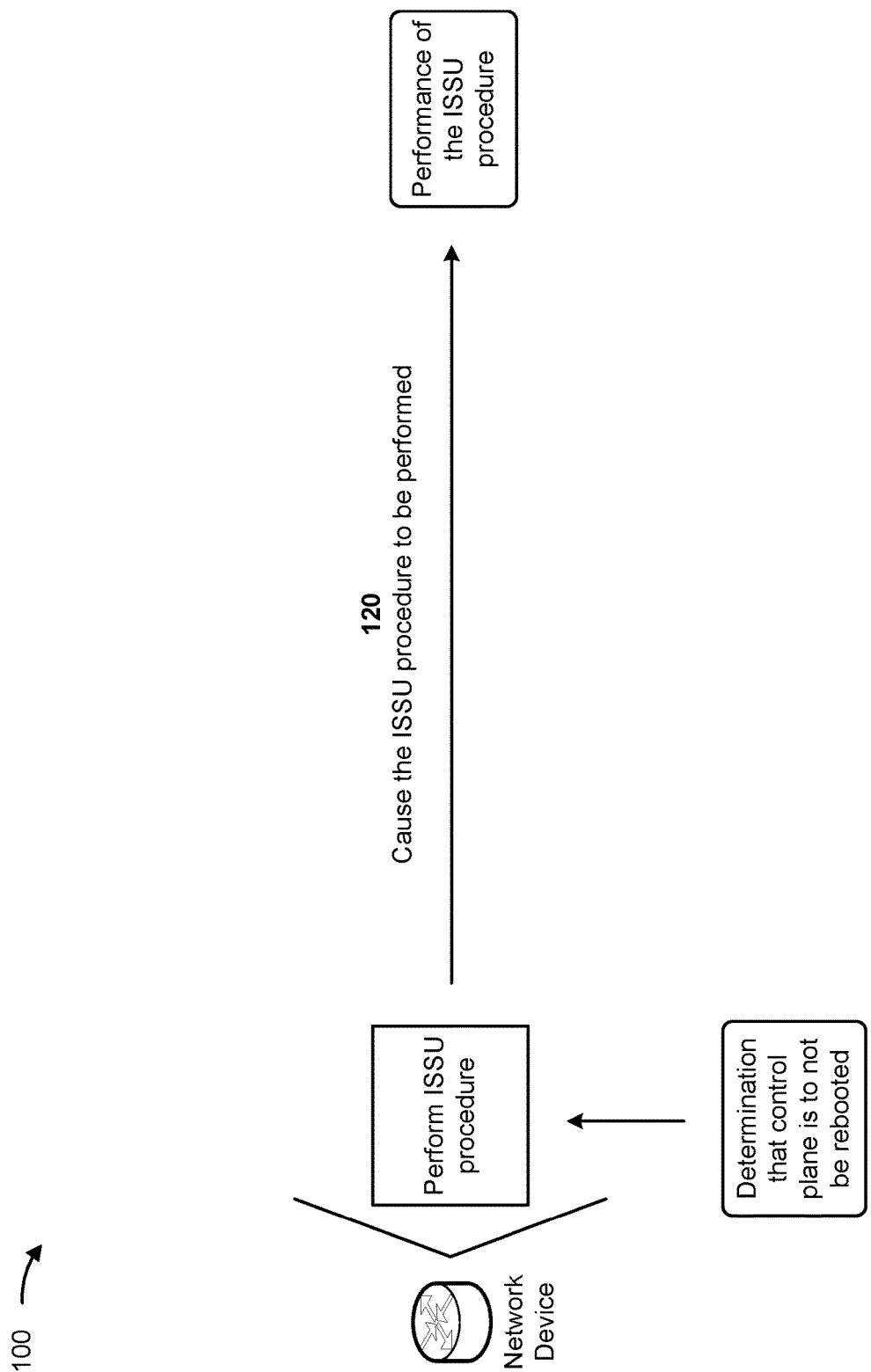

As shown in FIG. 1C, and by reference number 120, the network device may cause the ISSU procedure to be performed (e.g., after determining that the control plane is to not be rebooted). The network device may cause the ISSU procedure to be performed based on the data package (e.g., that the network device received from the server device). For example, the network device may process (e.g., execute) the data package to cause the network device to perform the ISSU procedure. In this way, the network device may cause at least one application, of the plurality of applications, to be updated (e.g., based on performance of the ISSU procedure). In some implementations, causing the ISSU procedure to be performed does not cause the plurality of applications to stop executing on the network device and does not cause the control plane state of the network device to be frozen (e.g., the ISSU procedure is performed in a different manner than that described herein in relations to FIGS. 1D-1F).

Figure 1D:
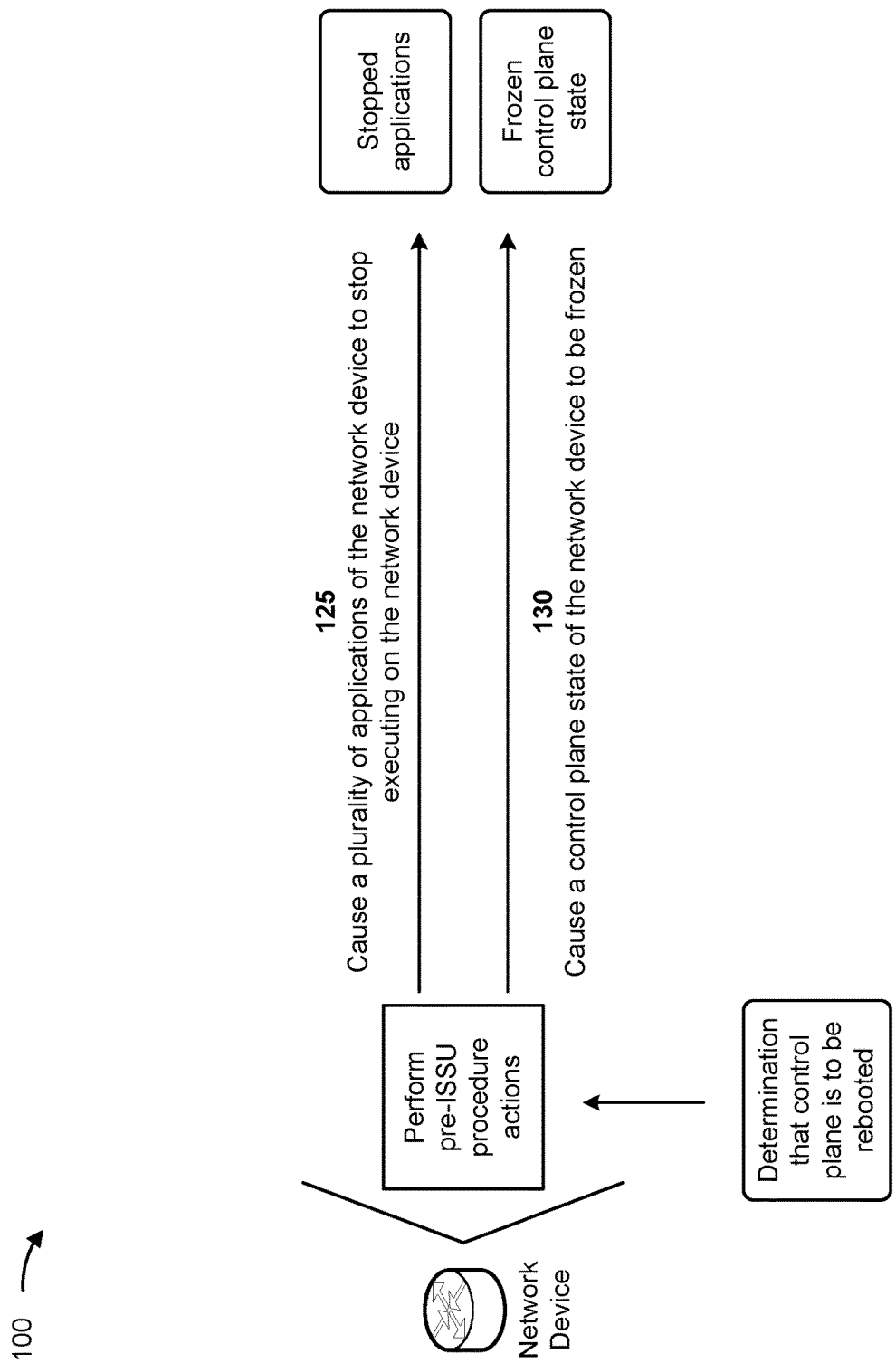
Figure 1E:
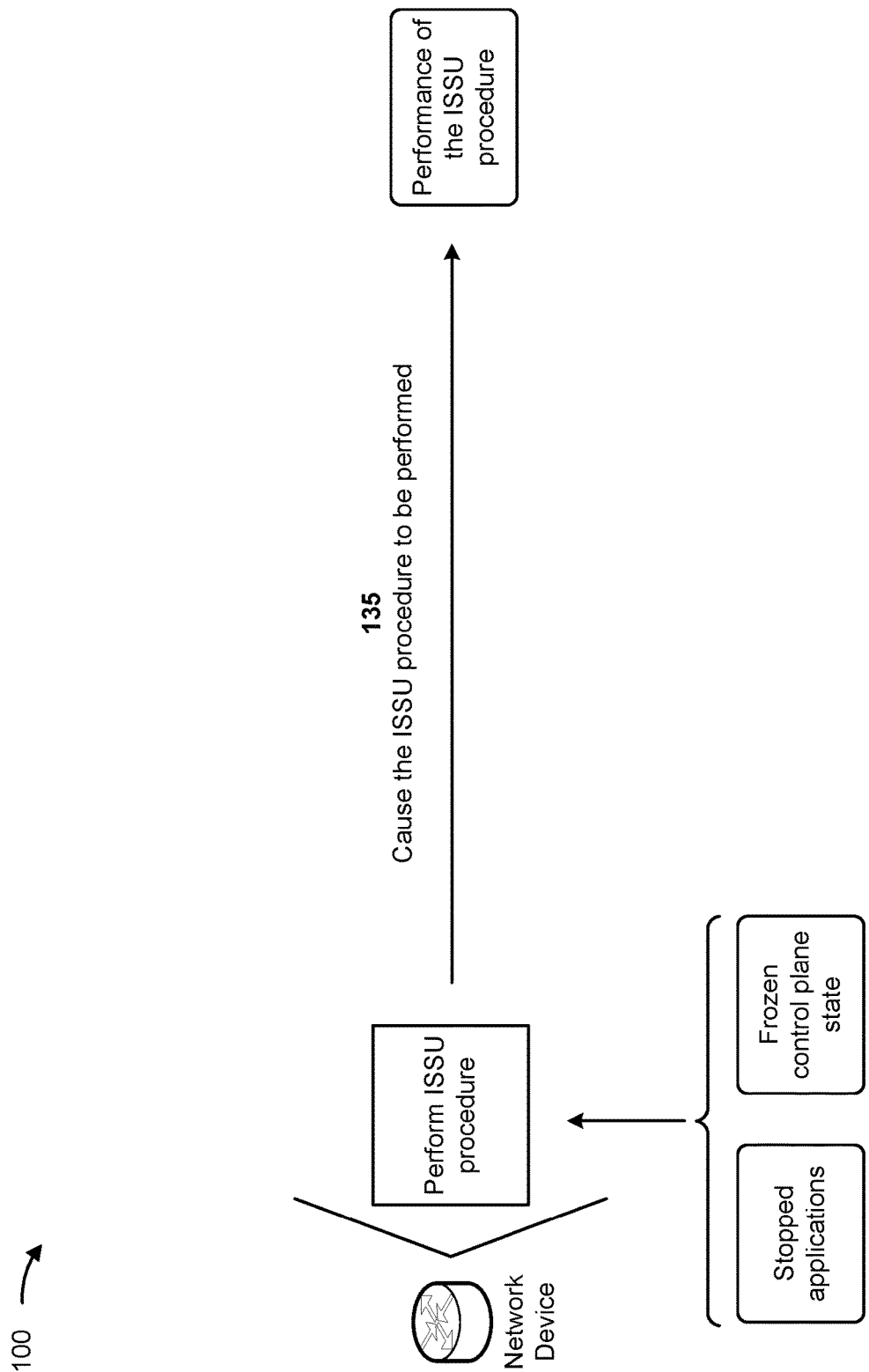

As shown in FIG. 1D, the network device may perform one or more processing steps prior to causing the ISSU procedure to be performed (e.g., as described herein in relation to FIG. 1E). As shown by reference number 125, the network device may cause the plurality of applications of the network device to stop executing on the network device (e.g., based on determining that the control plane is to be rebooted). For example, the network device (e.g., using the orchestration module and/or the system control module) may execute one or more commands to cause the plurality of applications to stop executing.

As another example, the plurality of applications may include a first set of one or more applications (e.g., one or more applications that modify, and/or are able to modify, the control plane state of the network device) and a second set of one or more applications (e.g., one or more applications that do not modify, and/or are not able to modify, the control plane state of the network device). Accordingly, the network device (e.g., using the orchestration module and/or the system control module) may cause the first set of one or more applications to stop executing and then may cause (e.g., after the first set of one or more applications have stopped executing) the second set of one or more applications to stop executing (e.g., in a sequential order). In this way, the control plane state of the network device may cease updating after the first set of one or more applications have stopped executing and therefore the state of the control plane may not drift (e.g., change) while the second set of one or more applications stop executing.

The first set of one or more applications may include, for example, applications associated with generating and maintaining routes (e.g., to and from other network devices), management of the network device, and/or similar functionalities. The second set of one or more applications may include, for example, applications associated with managing packet forwarding by the network device. In some implementations, at least a subset of the second set of one or more applications may be associated with another network device (e.g., a network device with an application specific integrated circuit (ASIC) configured to perform packet forwarding), and the network device may communicate with the other network device to cause the subset of the second set of one or more applications to stop executing.

As shown by reference number 130, the network device may cause a control plane state of the network device to be frozen (e.g., based on causing the plurality of applications to stop executing). For example, the network device (e.g., using the orchestration module and/or the storage control module) may identify data objects associated with the control plane state (e.g., that are generated by and/or maintained by at least some of the plurality of applications) and may cause the data objects to be stored in a data structure (e.g., a database, an electronic folder, an electronic file, or another data structure that is included in and/or is accessible to the network device). In some implementations, the data objects may be originally stored in one or more distributed data structures (DDSs) (e.g., that are included in and/or accessible to the network device) and the network device may store the data objects in a non-distributed data structure. In this way, the data objects may be frozen (also referred to as "preserved") during performance of the ISSU procedure (e.g., which may require clearing or resetting of the DDSs). In some implementations, at least a set of the data objects may be generated and/or maintained in association with operation of the other network device (e.g., the network device with the ASIC configured to perform packet forwarding), and the network device may communicate with the other network device to cause the data objects to be stored (e.g., as a compound data object, such as a binary large object (BLOB)) in the data structure (e.g., the non-distributed data structure).

As shown in FIG. 1E, and by reference number 135, the network device may cause the ISSU procedure to be performed (e.g., after causing the plurality of applications to stop executing and causing the control plane state of the network device to be frozen). The network device may cause the ISSU procedure to be performed based on the data package (e.g., that the network device received from the server device). For example, the network device (e.g., using the orchestration module) may process (e.g., execute) the data package to cause the network device to perform the ISSU procedure. In this way, the network device may cause the control plane operating system and kernel of the network device to be updated and/or may cause at least one application, of the plurality of applications, to be updated (e.g., based on performance of the ISSU procedure). In some implementations, the network device may cause the control plane operating system and kernel of the network device to update the control plane operating system and kernel (e.g., instead of another firmware element updating the control plane operating system and kernel), such as part of a Unix/Linux kexec command operation.

In some implementations, causing the ISSU procedure to be performed includes causing the control plane of the network device to be rebooted. Accordingly, the network device may send, to another network device that is connected to the network device (e.g., via one or more links), one or more messages indicating that the network device is to be unavailable for a particular period of time (e.g., that is associated with rebooting the network device and/or otherwise causing the ISSU procedure to be performed). This may enable a "graceful restart" of the network device, whereby the other network device maintains the one or more links between the network device and the other network device for the particular period of time (and therefore minimizes routing flap between the network devices after performance of the ISSU procedure). The particular period of time may be, for example, less than or equal to 100 seconds, 5 minutes, 20 minutes, 1 hour, or another amount of time (e.g., that is supported by a routing protocol, such as border gateway protocol (BGP)).

In some implementations, a data plane of the network device may continue to operate during a period of time associated with performance of the ISSU procedure. That is, the data plane of the network device may continue to receive and forward packets during the period of time (even though the plurality of applications have stopped executing, the control plane state of the network device is frozen, and/or the ISSU procedure is being performed). The period of time may begin when the network device causes the plurality of applications to stop executing and may end when the network device causes the plurality of applications to resume executing (e.g., as further described herein in relation to FIG. 1F); may begin when the network device causes the control plane state of the network device to be frozen and may end when the network device causes the control plane state of the network device to be restored (e.g., as further described herein in relation to FIG. 1F); and/or may begin when the network device starts causing the ISSU procedure to be performed and may end when the network device stops causing the ISSU procedure to be performed; among other examples. In this way, the network device operates in a "hitless" manner (e.g., with respect to packets received and forwarded by the data plane of the network device) while the network device undergoes an upgrade (e.g., an upgrade to the control plane of the network device).

Figure 1F:
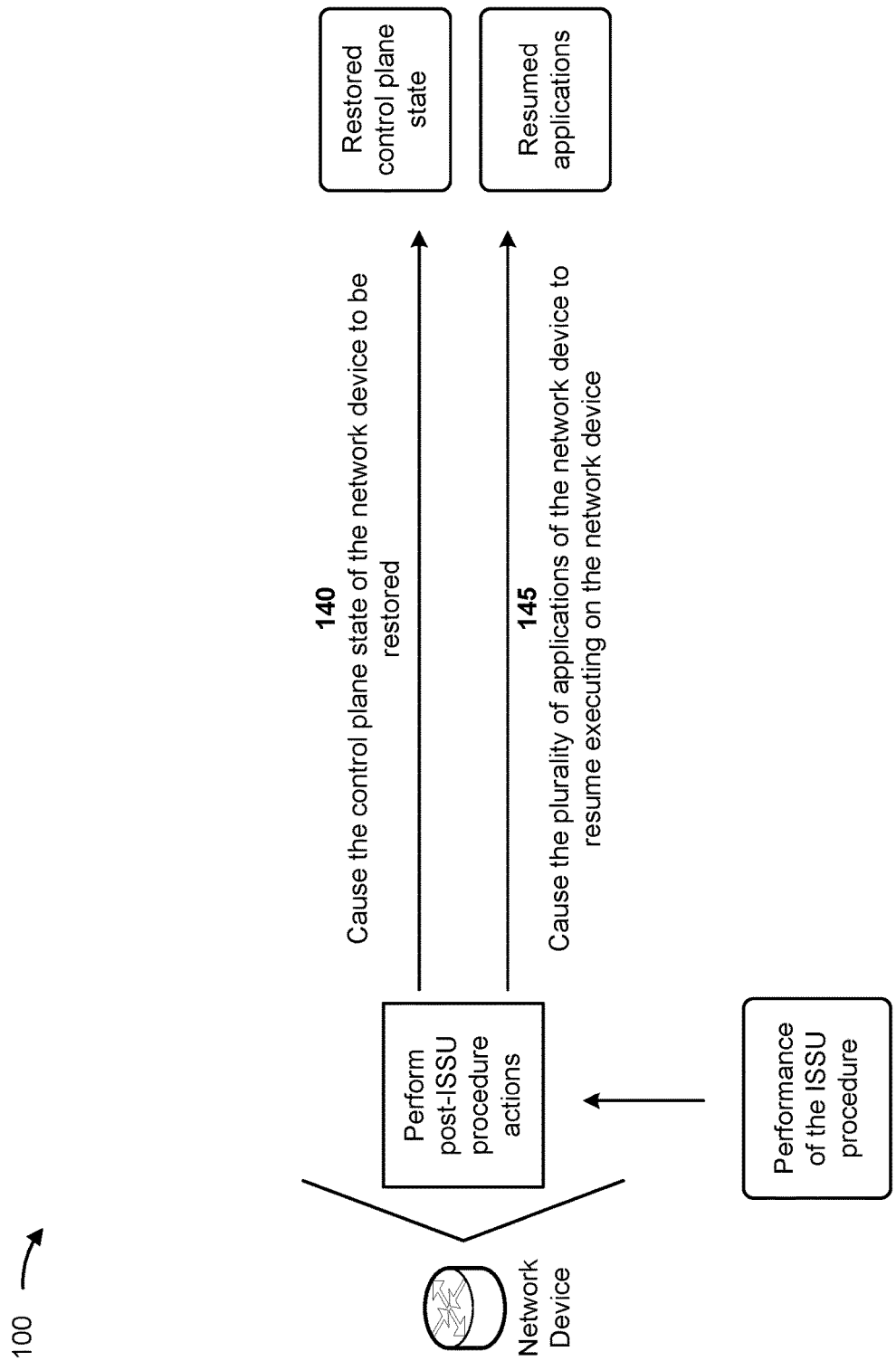

As shown in FIG. 1F, the network device may perform one or more processing steps after causing the ISSU procedure to be performed (e.g., as described herein in relation to FIG. 1E). As shown by reference number 140, the network device may cause the control plane state of the network device to be restored (e.g., based on causing the ISSU procedure to be performed). For example, the network device (e.g., using the orchestration module and/or the storage control module) may identify the data objects associated with the control plane state (e.g., that were generated by and/or maintained by at least some of the plurality of applications) in a data structure (e.g., the non-distributed data structure) and may cause the data objects to be stored in one or more other data structures (e.g., the one or more DDSs). In this way, the data objects may be restored to the one or more other data structures such that the control plane state of the network device is considered to be "unfrozen" (also referred to as "restored") after performance of the ISSU procedure. In some implementations, the network device may communicate with another network device, such as the network device with the ASIC configured to perform packet forwarding, to cause at least a set of the data objects (e.g., that were generated and/or maintained in association with operation of the other network device) to be restored in association with operation of the other network device (e.g., to allow the other network device to undergo a warmboot based on the at least a set of data objects).

As shown by reference number 145, the network device may cause the plurality of applications of the network device to resume executing on the network device (e.g., based on causing the control plane state of the network device to be restored). For example, the network (e.g., using the orchestration module and/or the system control module) device may execute one or more commands to cause the plurality of applications to resume executing.

As another example, the network device may cause the second set of one or more applications (e.g., the one or more applications that do not modify, and/or are not able to modify, the control plane state of the network device) to resume executing and then may cause (e.g., after the second set of one or more applications have resumed executing) the first set of one or more applications (e.g., the one or more applications that modify, and/or are able to modify, the control plane state of the network device) to resume executing (e.g., in a sequential order). In this way, the control plane state of the network device may resume updating (only) after the first set of one or more applications have resumed executing, and therefore the state of the control plane may not drift (e.g., change) prior to the first set of one or more applications having resumed executing. In some implementations, at least a subset of the second set of one or more applications may be associated with the other network device (e.g., the network device with the ASIC configured to perform packet forwarding), and the network device may communicate with the other network device to cause the subset of the second set of one or more applications to resume executing (e.g., before causing the first set of one or more applications to resume executing).

Figure 1G:
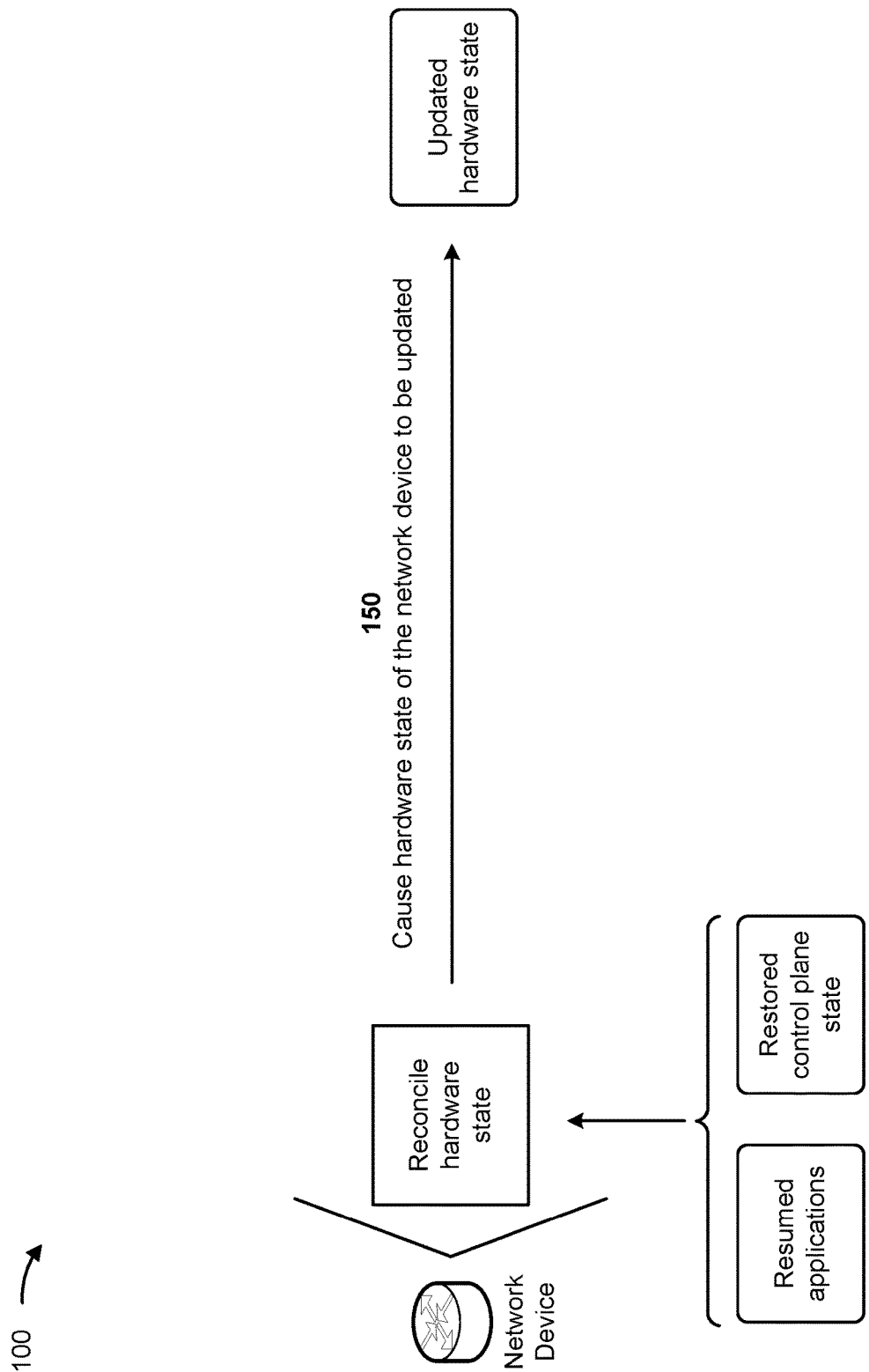

As shown in FIG. 1G, the network device may reconcile a hardware state of the network device (e.g., after the ISSU procedure and/or one or more other processing steps have been performed, as described herein in relation to FIGS. 1B-1F). For example, the network device (e.g., using the orchestration module and/or the system control module) may determine whether one or more hardware configurations of the network device were modified (e.g., whether a port of the network device was updated, or whether the network device is connected to a new device, among other examples) during the period of time associated with performance of the ISSU procedure (e.g., as described herein in relation to FIG. 1E). As shown by reference number 150, the network device may cause a hardware state of the network device to be updated (e.g., to indicate the modifications to the one or more hardware configurations of the network device). Alternatively, the network device may not cause the hardware state of the network device to be updated (e.g., when the network device determines that the one or more hardware configurations of the network device were not modified).

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
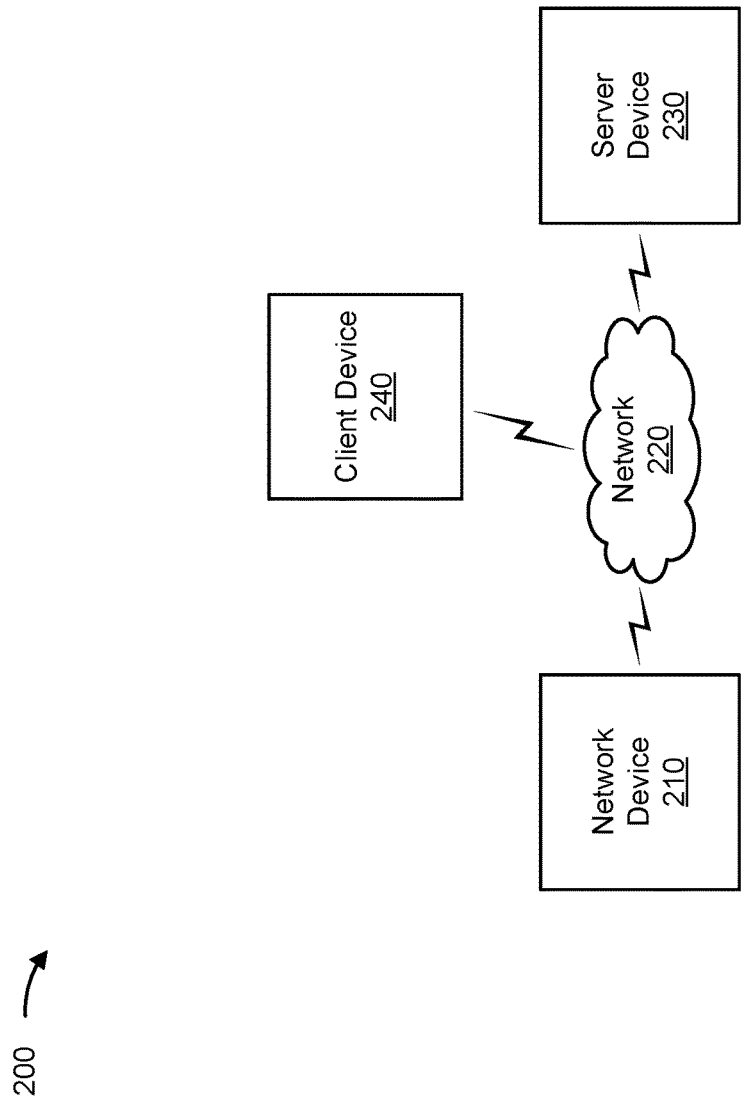
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a network device 210, a network 220, a server device 230, and/or a client device 240. Devices and/or elements of environment 200 may interconnect via wired connections and/or wireless connections.

Network device 210 includes one or more devices capable of receiving, processing, storing, routing, and/or providing information related to a hitless upgrade of network device 210, as described elsewhere herein. For example, network device 210 may include a router, such as a label switching router (LSR), a label edge router (LER), an ingress router, an egress router, a provider router (e.g., a provider edge router or a provider core router), a virtual router, or another type of router. Additionally, or alternatively, network device 210 may include a gateway, a switch, a firewall, a hub, a bridge, a reverse proxy, a server (e.g., a proxy server, a cloud server, or a data center server), a load balancer, and/or a similar device. In some implementations, network device 210 may be a physical device implemented within a housing, such as a chassis. In some implementations, network device 210 may be a virtual device implemented by one or more computer devices of a cloud computing environment or a data center. In some implementations, a group of network devices 210 may be a group of data center nodes that are used to route traffic flow through network 220. In some implementations, network device 210 may include a control plane and a data plane. The control plane of network device 210 may include one or more modules, or other logical elements, such as a control plane operating system and kernel, an orchestration module, an image module, a system control module, a storage control module, a routing control module, and/or other modules.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

Server device 230 includes one or more devices capable of receiving, generating, storing, processing, providing, and/or routing information related to a hitless upgrade of network device 210, as described elsewhere herein. Server device 230 may include a communication device and/or a computing device. For example, server device 230 may include a server, such as an application server, a client server, a web server, a database server, a host server, a proxy server, a virtual server (e.g., executing on computing hardware), or a server in a cloud computing system. In some implementations, server device 230 includes computing hardware used in a cloud computing environment.

Client device 240 includes one or more devices capable of receiving, generating, storing, processing, and/or providing information associated with hitless upgrade of network device 210, as described elsewhere herein. Client device 240 may include a communication device and/or a computing device. For example, client device 240 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
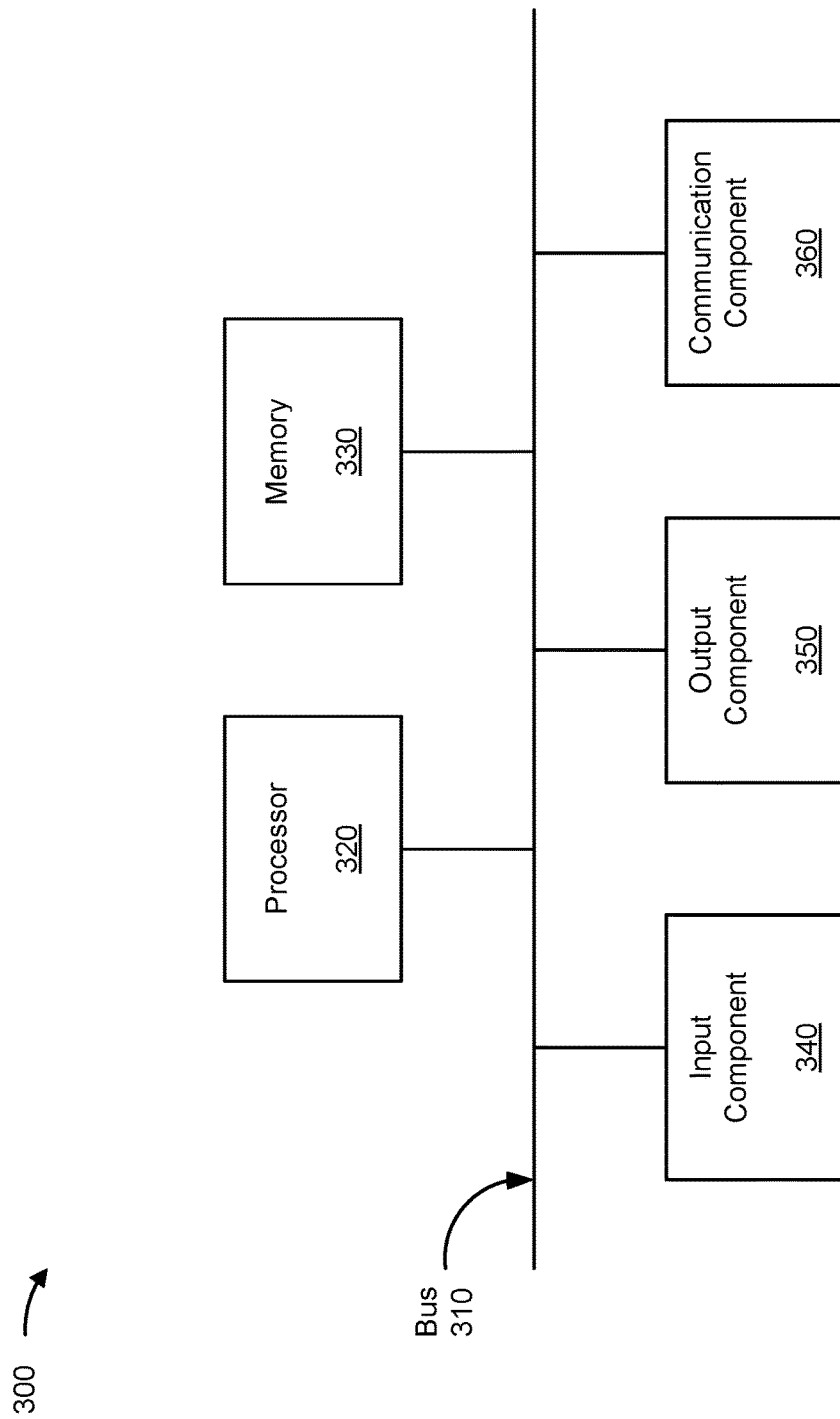
FIGS. 3-4 are diagrams of example components of one or more devices of FIG. 2.

FIG. 3 is a diagram of example components of a device 300, which may correspond to network device 210, server device 230, and/or client device 240. In some implementations, network device 210, server device 230, and/or client device 240 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
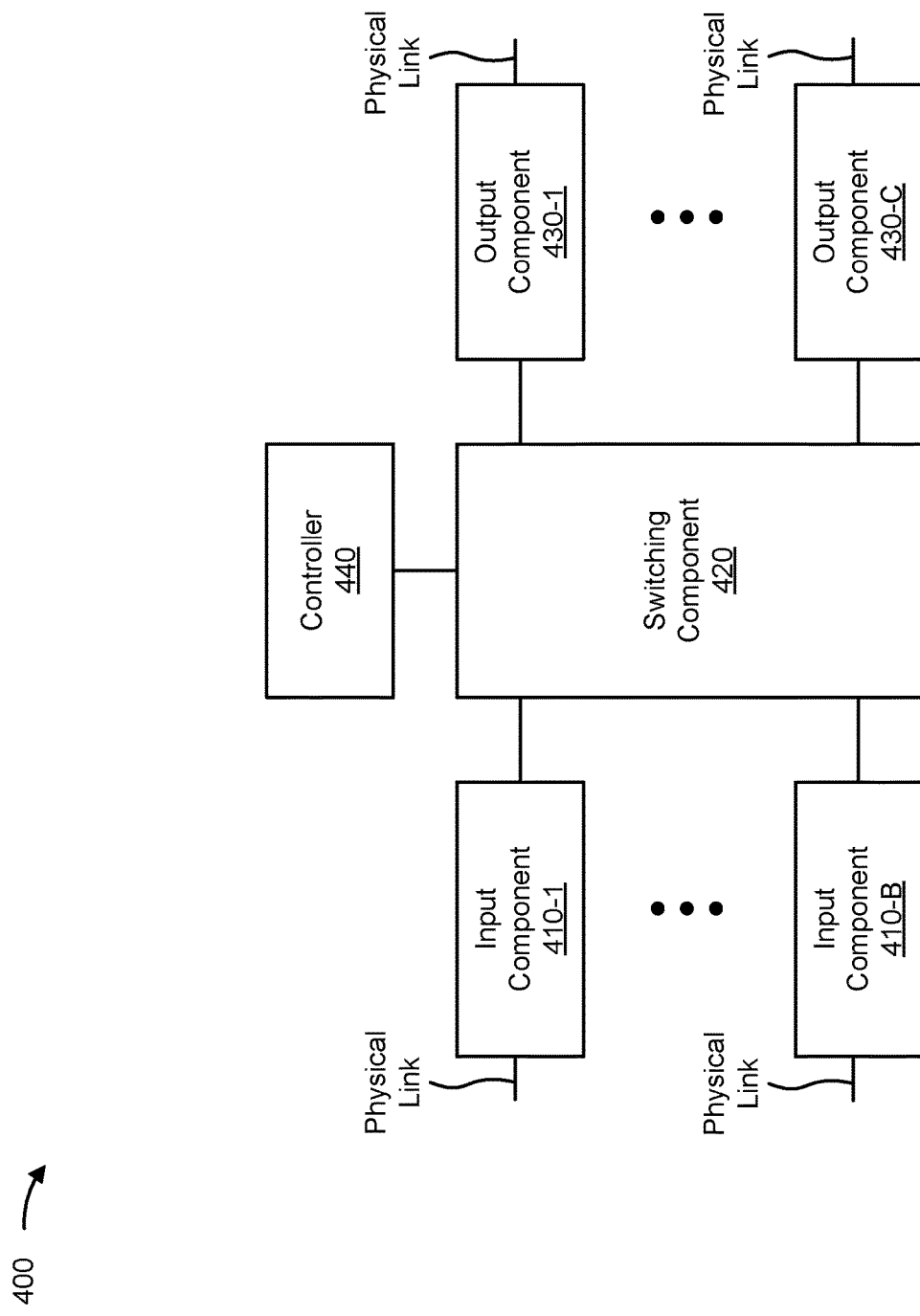

FIG. 4 is a diagram of example components of a device 400. Device 400 may correspond to network device 210, server device 230, and/or client device 240. In some implementations, network device 210, server device 230, and/or client device 240 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
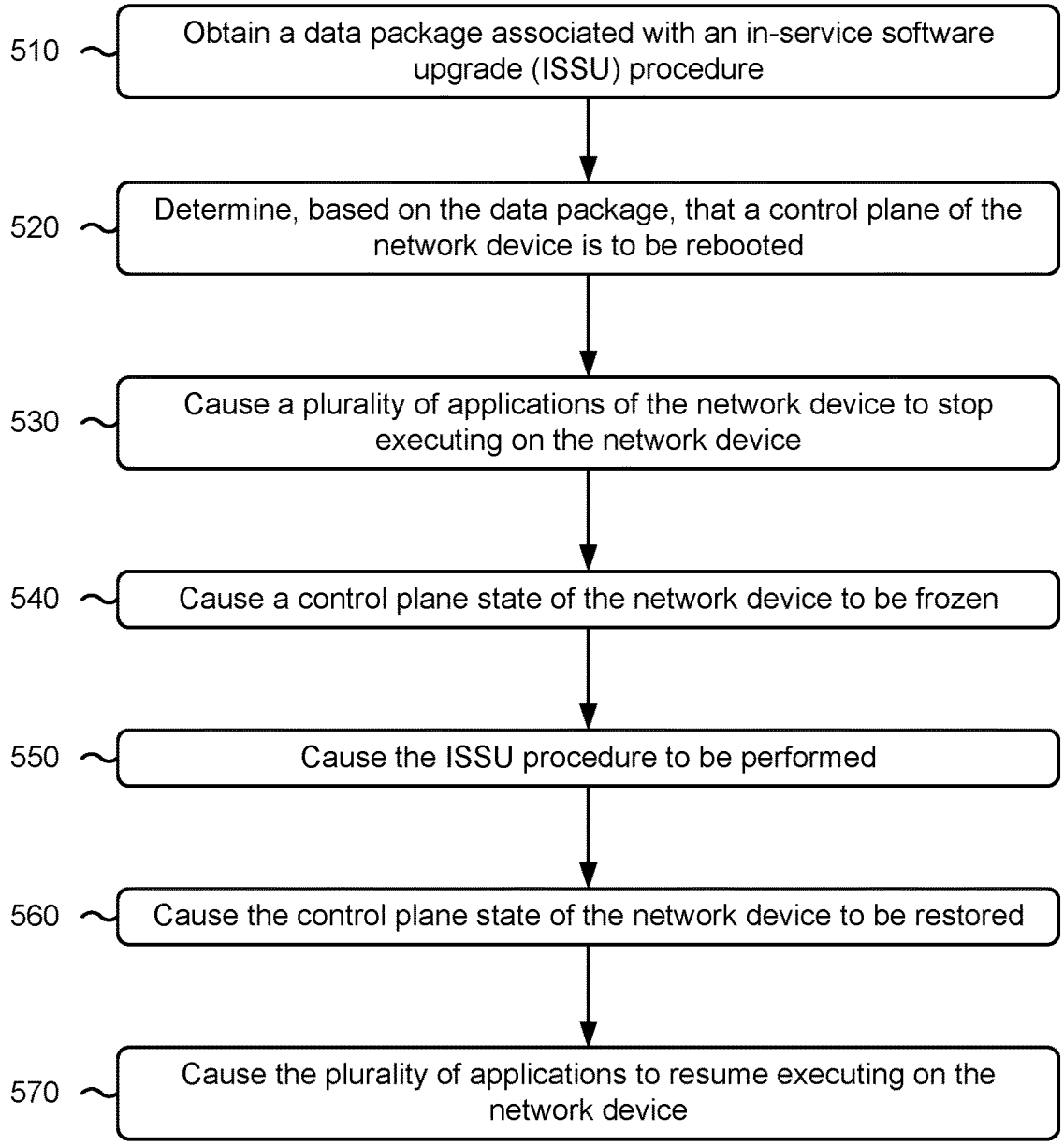
FIG. 5 is a flowchart of example processes relating to hitless upgrade of a network device.

FIG. 5 is a flowchart of an example process 500 associated with hitless upgrade of a network device. In some implementations, one or more process blocks of FIG. 5 are performed by the network device (e.g., network device 210). In some implementations, one or more process blocks of FIG. 5 are performed by another device or a group of devices separate from or including the network device, such as a server device (e.g., server device 230) and/or a client device (e.g., client device 240). Additionally, or alternatively, one or more process blocks of FIG. 5 may be performed by one or more components of device 300, such as processor 320, memory 330, input component 340, output component 350, and/or communication component 360; one or more components of device 400, such as input component 410-1, switching component 420, output component 430, and/or controller 440; and/or one or more components of another device.

As shown in FIG. 5, process 500 may include obtaining a data package associated with an in-service software upgrade (ISSU) procedure (block 510). For example, the network device may obtain a data package associated with an ISSU procedure, as described above.

As further shown in FIG. 5, process 500 may include determining, based on the data package, that a control plane of the network device is to be rebooted (block 520). For example, the network device may determine, based on the data package, that a control plane of the network device is to be rebooted (e.g., to facilitate performance of the ISSU procedure), as described above.

As further shown in FIG. 5, process 500 may include causing a plurality of applications of the network device to stop executing on the network device (block 530). For example, the network device may cause a plurality of applications of the network device to stop executing on the network device, as described above.

As further shown in FIG. 5, process 500 may include causing a control plane state of the network device to be frozen (block 540). For example, the network device may cause a control plane state of the network device to be frozen, as described above.

As further shown in FIG. 5, process 500 may include causing the ISSU procedure to be performed (block 550). For example, the network device may cause the ISSU procedure to be performed, as described above.

As further shown in FIG. 5, process 500 may include causing the control plane state of the network device to be restored (block 560). For example, the network device may cause the control plane state of the network device to be restored, as described above.

As further shown in FIG. 5, process 500 may include causing the plurality of applications to resume executing on the network device (block 570). For example, the network device may cause the plurality of applications to resume executing on the network device, as described above.

Process 500 may include additional implementations, such as any single implementation or any combination of implementations described below and/or in connection with one or more other processes described elsewhere herein.

In a first implementation, obtaining the data package includes receiving, from a client device, a command indicating that the network device is to be updated via performance of the ISSU procedure, sending, to a server device and based on the command, a request for the data package, and receiving, based on sending the request, the data package.

In a second implementation, alone or in combination with the first implementation, determining that the control plane of the network device is to be rebooted includes processing the data package to identify a first set of one or more applications, of the plurality of applications, that are to be updated as a result of performance of the ISSU procedure; determining, based on the first set of one or more applications of the network device, a second set of one or more applications of the plurality of applications that are to be impacted by performance of the ISSU procedure; and determining, based on the second set of one or more applications, that the control plane of the network device is to be rebooted to facilitate performance of the ISSU procedure.

In a third implementation, alone or in combination with one or more of the first and second implementations, the plurality of applications includes a first set of one or more applications and a second set of one or more applications, and causing the plurality of applications to stop executing on the network device includes causing the first set of one or more applications to stop executing; and causing, after the first set of one or more applications have stopped executing, the second set of one or more applications to stop executing. The control plane state is to cease updating after the first set of one or more applications have stopped executing.

In a fourth implementation, alone or in combination with one or more of the first through third implementations, causing the plurality of applications to resume executing on the network device includes causing the second set of one or more applications to resume executing, and causing, after the second set of one or more applications have resumed executing, the first set of one or more applications to resume executing, wherein the control plane state is to resume updating after the first set of one or more applications have resumed executing.

In a fifth implementation, alone or in combination with one or more of the first through fourth implementations, causing the control plane state of the of the network device to be frozen includes identifying data objects associated with the control plane state that are stored in one or more distributed data structures, and causing the data objects to be stored in a non-distributed data structure.

In a sixth implementation, alone or in combination with one or more of the first through fifth implementations, causing the ISSU procedure to be performed includes at least one of causing a control plane operating system and kernel of the network device to update the control plane operating system and kernel, or causing at least one application, of the plurality of applications, to be updated.

In a seventh implementation, alone or in combination with one or more of the first through sixth implementations, a data plane of the network device continues to operate during a period of time that begins when the network device causes the plurality of applications to stop executing and that ends when the network device causes the plurality of applications to resume executing.

In an eighth implementation, alone or in combination with one or more of the first through seventh implementations, causing the control plane state of the network device to be restored includes identifying data objects associated with the control plane state that are stored in a non-distributed data structure, and causing the data objects to be stored in one or more distributed data structures.

In a ninth implementation, alone or in combination with one or more of the first through eighth implementations, causing the network device to determine that the control plane of the network device is to be rebooted includes determining that a control plane operating system and kernel of the network device is to be updated as a result of performance of the ISSU procedure, and determining, based on determining that the control plane operating system and kernel of the network device is to be updated, that the control plane of the network device is to be rebooted as part of performance of the ISSU procedure.

In a tenth implementation, alone or in combination with one or more of the first through ninth implementations, causing the network device to cause the ISSU procedure to be performed includes sending, to another network device that is connected to the network device, one or more messages indicating that the network device is to be unavailable for a particular period of time.

In an eleventh implementation, alone or in combination with one or more of the first through tenth implementations, process 500 includes causing, based on causing the plurality of applications to resume executing on the network device, a hardware state of the network device to be updated.

In an twelfth implementation, alone or in combination with one or more of the first through eleventh implementations, process 500 includes determining that the network device is to not be rebooted as part of performance of another ISSU procedure; and causing, based on determining that the network device is to not be rebooted, the other ISSU procedure to be performed, wherein causing the other ISSU procedure to be performed does not cause the plurality of applications to stop executing on the network device and does not cause the control plane state of the network device to be frozen.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network device, comprising:
   one or more memories; and
   one or more processors to:
      obtain a data package associated with an in-service software upgrade (ISSU) procedure;
      determine, based on the data package, that a control plane of the network device is to be rebooted to facilitate performance of the ISSU procedure;
      cause, based on determining that the control plane is to be rebooted, a plurality of applications of the network device to stop executing on the network device;
      cause, based on causing the plurality of applications to stop executing, a control plane state of the network device to be frozen,
         wherein the one or more processors, to cause the control plane state of the network device to be frozen, are to:
            identify data objects that are associated with the control plane state and that are stored in one or more distributed data structures, and
            cause the data objects to be stored in a non-distributed data structure to preserve the data objects during performance of the ISSU procedure;
      cause, based on causing the control plane state of the network device to be frozen, the IS SU procedure to be performed;
      cause, based on causing the ISSU procedure to be performed, the control plane state of the network device to be restored,
         wherein the one or more processors, to cause the control plane state of the network device to be restored, are to:
            cause the data objects to be restored in the one or more distributed data structures; and
      cause, based on causing the control plane state of the network device to be restored, the plurality of applications to resume executing on the network device.

2. The network device of claim 1, wherein the one or more processors, to obtain the data package, are to:
   receive, from a client device, a command indicating that the network device is to be updated via performance of the IS SU procedure;

send, to a server device and based on the command, a request for the data package; and receive, based on sending the request, the data package.

3. The network device of claim 1, wherein the one or more processors, to determine that the control plane of the network device is to be rebooted to facilitate performance of the ISSU procedure, are to:

process the data package to identify a first set of one or more applications, of the plurality of applications, that are to be updated as a result of performance of the ISSU procedure;

determine, based on the first set of one or more applications of the network device, a second set of one or more applications of the plurality of applications that are to be impacted by performance of the ISSU procedure; and determine, based on the second set of one or more applications, that the control plane of the network device is to be rebooted to facilitate performance of the ISSU procedure.

4. The network device of claim 1, wherein the plurality of applications includes a first set of one or more applications and a second set of one or more applications, wherein the one or more processors, to cause the plurality of applications to stop executing on the network device, are to:

cause the first set of one or more applications to stop executing; and cause, after the first set of one or more applications have stopped executing, the second set of one or more applications to stop executing, wherein the control plane state is to cease updating after the first set of one or more applications have stopped executing.

5. The network device of claim 4, wherein the one or more processors, to cause the plurality of applications to resume executing on the network device, are to:

cause the second set of one or more applications to resume executing; and cause, after the second set of one or more applications have resumed executing, the first set of one or more applications to resume executing, wherein the control plane state is to resume updating after the first set of one or more applications have resumed executing.

6. The network device of claim 1, wherein the one or more processors, to cause the ISSU procedure to be performed, are to:

cause, based on the data package, a control plane operating system and kernel of the network device to update the control plane operating system and kernel.

7. The network device of claim 1, wherein a data plane of the network device continues to operate during a period of time that begins when the network device causes the plurality of applications to stop executing and that ends when the network device causes the plurality of applications to resume executing.

8. The network device of claim 1, wherein the one or more processors, to cause the control plane state of the network device to be restored, are further to:

identify the data objects that are stored in the non-distributed data structure.

9. The network device of claim 1, wherein the one or more processors, when causing the data objects to be stored in the non-distributed data structure, are to cause the data objects to be stored in the non-distributed data structure as a binary large object (BLOB).

10. A non-transitory computer-readable medium storing a set of instructions, the set of instructions comprising:

one or more instructions that, when executed by one or more processors of a network device, cause the network device to:

determine that a control plane of the network device is to be rebooted as part of performance of an in-service software upgrade (ISSU) procedure;

cause, based on determining that the network device is to be rebooted, a plurality of applications of the network device to stop executing on the network device;

cause, based on causing the plurality of applications to stop executing, a control plane state of the network device to be frozen, wherein the one more instructions, that cause the network device to cause the control plane state of the network device to be frozen, cause the network device to:

identify data objects that are associated with the control plane state and that are stored in one or more distributed data structures, and cause the data objects to be stored in a non-distributed data structure to preserve the data objects during performance of the ISSU procedure;

cause, after causing the control plane state of the network device to be frozen, the ISSU procedure to be performed; and cause, based on causing the ISSU procedure to be performed, the data objects to be restored in the one or more distributed data structures.

11. The non-transitory computer-readable medium of claim 10, wherein the one or more instructions, that cause the network device to determine that the control plane of the network device is to be rebooted as part of performance of the ISSU procedure, cause the network device to:

determine that a control plane operating system and kernel of the network device is to be updated as a result of performance of the ISSU procedure; and determine, based on determining that the control plane operating system and kernel of the network device is to be updated, that the control plane of the network device is to be rebooted as part of performance of the ISSU procedure.

12. The non-transitory computer-readable medium of claim 10, wherein the one or more instructions, that cause the network device to cause the plurality of applications to stop executing on the network device, cause the network device to:

cause a first set of one or more applications, of the plurality of applications, to stop executing; and cause, after the first set of one or more applications have stopped executing, a second set of one or more applications, of the plurality of applications, to stop executing.

13. The non-transitory computer-readable medium of claim 10, wherein the one or more instructions, that cause the network device to cause the ISSU procedure to be performed, cause the network device to:

cause at least one application, of the plurality of applications, to be updated.

14. The non-transitory computer-readable medium of claim 10, wherein the one or more instructions, that cause the network device to cause the ISSU procedure to be performed, cause the network device to:

send, to another network device that is connected to the network device, one or more messages indicating that the network device is to be unavailable for a particular period of time.

15. The non-transitory computer-readable medium of claim 10, wherein the one or more instructions, when executed by the one or more processors, further cause the network device to:

cause, based on causing the data objects to be restored in the one or more distributed data structures, the plurality of applications to resume executing on the network device.

16. The non-transitory computer-readable medium of claim 15, wherein the one or more instructions, when executed by the one or more processors, further cause the network device to:

cause, based on causing the plurality of applications to resume executing on the network device, a hardware state of the network device to be updated.

17. The non-transitory computer-readable medium of claim 10, wherein the one or more instructions, when executed by the one or more processors, further cause the network device to:

determine that the network device is to not be rebooted as part of performance of another ISSU procedure; and cause, based on determining that the network device is to not be rebooted, the other ISSU procedure to be performed, wherein causing the other ISSU procedure to be performed does not cause the plurality of applications to stop executing on the network device and does not cause the control plane state of the network device to be frozen.

18. A method, comprising:

causing, by a network device, a plurality of applications of the network device to stop executing on the network device;

causing, by the network device and based on causing the plurality of applications to stop executing, a control plane state of the network device to be frozen, wherein causing the control plane state of the network device to be frozen includes:

identifying, by the network device, data objects that are associated with the control plane state and that are stored in one or more distributed data structures, and causing, by the network device, the data objects to be stored in a non-distributed data structure to preserve the data objects during performance of an in-service software upgrade (ISSU) procedure;

causing, by the network device and based on causing the control plane state of the network device to be frozen, the ISSU procedure to be performed; and causing, by the network device and based on causing the ISSU procedure to be performed, the data objects to be restored in the one or more distributed data structures.

19. The method of claim 18, further comprising:

causing, based on causing the data objects to be restored in the one or more distributed data structures, the plurality of applications to resume executing on the network device.

20. The method of claim 18, wherein causing the ISSU procedure to be performed comprises at least one of:

causing a control plane operating system and kernel of a control plane of the network device to be updated; or causing at least one application, of the plurality of applications, to be updated.

* * * * *